(12) United States Patent
Werner et al.

(10) Patent No.: US 8,342,306 B2
(45) Date of Patent: Jan. 1, 2013

(54) HYDRODYNAMIC TORQUE CONVERTER

(75) Inventors: Markus Werner, Buehl (DE); Jan Loxtermann, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/088,062

(22) Filed: Apr. 15, 2011

(65) Prior Publication Data

US 2011/0192692 A1 Aug. 11, 2011

Related U.S. Application Data

(63) Continuation of application No. PCT/DE2009/001342, filed on Sep. 24, 2009.

(30) Foreign Application Priority Data

Oct. 16, 2008 (DE) .......................... 10 2008 051 972

(51) Int. Cl.
*F16H 45/02* (2006.01)
*F16F 15/14* (2006.01)
*F16F 15/12* (2006.01)
*F16D 3/12* (2006.01)

(52) U.S. Cl. .................. 192/3.3; 192/213.1; 60/338

(58) Field of Classification Search .................. 74/574.2; 60/338
See application file for complete search history.

(56) References Cited

U.S. PATENT DOCUMENTS

| 4,036,341 | A | * | 7/1977 | Beeskow et al. | ......... 192/213.31 |
| 6,026,940 | A | * | 2/2000 | Sudau | ........................ 192/3.28 |
| 2007/0056820 | A1 | * | 3/2007 | Degler | ........................ 192/3.29 |
| 2010/0236228 | A1 | | 9/2010 | Degler et al. | |

FOREIGN PATENT DOCUMENTS

| DE | 19804227 | 8/1999 |
| DE | 10236752 | 2/2004 |
| DE | 102004004176 | 8/2005 |
| DE | 102008057648 | 6/2009 |
| EP | 1464873 | 10/2004 |

* cited by examiner

*Primary Examiner* — Rodney Bonck
(74) *Attorney, Agent, or Firm* — Simpson & Simpson, PLLC

(57) ABSTRACT

A hydrodynamic torque converter (1), comprising a turbine wheel (9) driven by an impeller (8) and connected to an output part, and comprising a housing (34), in which a torsional vibration damper (19) having several damper stages (17, 20) and a centrifugal force pendulum (11), and also a converter lockup clutch (18) connecting a housing and an output part (3), are accommodated. In order to avoid any striking of the pendulum masses of the centrifugal force pendulum in internal combustion engines having large oscillating angles driving the torque converter, a turbine damper is connected in the power flow upstream of the centrifugal force pendulum.

14 Claims, 3 Drawing Sheets

HYDRODYNAMIC TORQUE CONVERTER

CROSS-REFERENCE TO RELATED APPLICATIONS

This application is filed under 35 U.S.C. §120 and §365(c) as a continuation of International Patent Application No. PCT/DE2009/001342, filed on Sep. 24, 2009, which application claims priority from German Patent Application No. 10 2008 051 972.3, filed on Oct. 16, 2008, which applications are incorporated herein by reference in their entirety.

FIELD OF THE INVENTION

The invention relates to a hydrodynamic torque converter with an impeller, a turbine, a lock-up clutch as well as a torsional vibration damper and a torsional vibration absorber.

BACKGROUND OF THE INVENTION

Torque converters are familiar in drive trains of motor vehicles and are preferably disposed between an internal combustion engine and a transmission. Thereby, the converter's function with excessive torque increase is preferably utilized for starting the motor vehicle, in that the torque from the housing that is driven by the internal combustion engine is transmitted via the impeller that in turn drives the turbine that transmits torque via an output part with the support on a stator for torque increase to a transmission input shaft of the transmission unit. At higher speeds, the lock-up clutch is closed so that torque is transmitted directly from the housing via the output part to the transmission input shaft, bypassing the converter components, and the deteriorating efficiency of converter components at higher speeds is inhibited.

The internal combustion engines finding application, particularly 4-cylinder diesel engines, feature high rotational irregularities so that torsional vibration dampers are provided in the housing of the torque converter, which can be disposed effectively in the closed lock-up clutch between the housing and the output part and/or for an open lock-up clutch, between turbine and the output part of the torque converter. Thereby, a torsional vibration damper in the known manner is understood as an arrangement with an input- and an output part, which, for instance, contrary to the effect of energy accumulators disposed over the circumference, are limitedly rotatable relative to one another. Such torsional vibration dampers can contain several damper stages that are disposed in series and/or in parallel to one another.

For improved vibration insulation of torsional vibrations of the internal combustion engine, the application of centrifugal force pendulums in the housing of the torque converter has been disclosed, which can also be integrated effectively in the housing in connection with torsional vibration dampers. Such an arrangement of damping units may not be adequate in internal combustion engines of the above-mentioned type, so that pendulum weights on the centrifugal force pendulum are possible. The design of the centrifugal force pendulum can therefore be difficult, particularly at low speeds with high swivel angles of the internal combustion engine. Limit stops of pendulum weights or masses act, particularly, on the drive train of a motor vehicle, through a humming sound that causes discomfort.

BRIEF SUMMARY OF THE INVENTION

Object of the invention is a torque converter with corresponding vibration insulation, in which a centrifugal force pendulum is not exposed or only exposed in a reduced manner, to pendulum knocks, and/or the design of the centrifugal force pendulum is simplified under such conditions, for instance, the vibration angle of the centrifugal force pendulum is reduced.

The object is met by a hydrodynamic torque converter with a turbine driven by an impeller and connected with a output part as well as housing, in which a torsional vibration damper with several damper stages and a torsional vibration absorber as well as housing and lock-up clutch connecting the output part are installed additionally. The torsional vibration absorber is connected with the turbine and is formed by a centrifugal force pendulum and a turbine absorber. By dividing the torsional vibration absorber into a turbine absorber and a centrifugal force pendulum, improvement of vibration insulation is achieved, in that by connecting the turbine absorber in the torque path upstream of the centrifugal force pendulum, the latter can be tuned to a smaller vibration angle in a less complex manner. Thus, for instance, vibration angles of the pendulum masses relative to the disk part carrying them can be made smaller than 40°, without them knocking on the disk part under normal operating conditions of a drive train, for instance, in connection with a 4-cylinder diesel engine.

The torsional vibration insulation unit, consisting of a torsional vibration damper, which can comprise the clutch damper assigned to the lock-up clutch and a turbine damper assigned to the turbine, and a torsional vibration absorber can be designed such that individual components are equipped with multiple functions depending upon the operating state of the lock-up clutch. For instance, damper elements such as damper stages of the torsional vibration damper can be assigned to the torque path via converter components like impeller and turbine to the torque path via the lock-up clutch. Moreover, depending upon the manner of operation of the lock-up clutch, the turbine absorber can be designed as a pure absorber or as a vibration damper. For instance, the turbine absorber works as an absorber for a closed lock-up clutch, such that the turbine forms an absorber mass of the turbine absorber. For an open lock-up clutch, the turbine absorber forms a damper stage of a turbine damper acting between turbine and output part.

Furthermore, a clutch damper assigned to the lock-up clutch can be formed as two-stage. In an advantageous manner, for a damper stage of the clutch damper for a closed lock-up clutch, the turbine damper can be switched in so that it is used together by both the clutch damper and the turbine damper. For this purpose, the clutch damper comprises an intermediate part common to both damper stages. This intermediate part can still be connected non-rotatably with a flange part of the turbine absorber. Thereby, to facilitate the function of a torsional vibration damper, the turbine absorber is equipped with a cover plate that is limitedly rotatable relative to the flange part against the effect of energy accumulators, which on the other hand is connected non-rotatably with the turbine. For an open lock-up clutch, the torque present on the housing from the internal combustion engine flows via the impeller to the turbine. The turbine absorber serves as the first damper stage and feeds torque via the cover plate and the energy accumulator to the intermediate part and from there via the second damper stage of the clutch damper into the output part of the torque converter, from where it is fed into the transmission input shaft. The centrifugal force pendulum is assigned non-rotatably to the turbine by means of a disk part and acts in this configuration state as a single torsional vibration absorber.

In the closed state of the lock-up clutch, the torque from the housing is fed via the lock-up clutch into the first damper stage of the torsional vibration damper and from there into the output part of the transmission input shaft. Through the linkage of the turbine absorber to the intermediate part of both damper stages, the turbine absorber couples to the clutch damper by means of its flange parts, whereby the turbine connected to the cover plate serves as an absorber mass. Thereby, hydrodynamic effects, particularly the blades of the turbine contribute additional moments of inertia. The centrifugal force pendulum, for example, coupled with the turbine is thereby only exposed to the vibration angles—not yet absorbed—by the turbine absorber and can be dimensioned accordingly for a smaller vibration angle.

An advantageous embodiment in this case provides for an output part of the torque converter, which is connected non-rotatably with a transmission input shaft of a transmission. On the output part, for instance, a so-called damper hub splined with the transmission input shaft, an input part of the clutch damper and a turbine hub is mounted rotatably and an output part of the torsional vibration damper is mounted non-rotatably. Thereby, the output part of the torsional vibration damper and the output part of the torque converter are formed advantageously, for instance, manufactured by means of a sintering- or forging process. In this embodiment, the turbine hub non-rotatably accommodates the cover plate, the turbine and the disk part of the centrifugal force pendulum carrying the pendulum mass on the turbine hub. On the turbine hub, a radially raised, revolving flange can be provided, on which cover plate, turbine hub and disk part are mounted, for example, by common riveting or other fastening means.

In an advantageous manner, a friction device can be provided between the flange part and the cover plate, for instance, in the form of a diaphragm spring braced between the flange part and the cover plate.

BRIEF DESCRIPTION OF THE SEVERAL VIEWS OF THE DRAWING

The nature and mode of operation of the present invention will now be more fully described in the following detailed description of the invention taken with the accompanying drawing figures, in which.

DETAILED DESCRIPTION OF THE INVENTION

Figure 1:
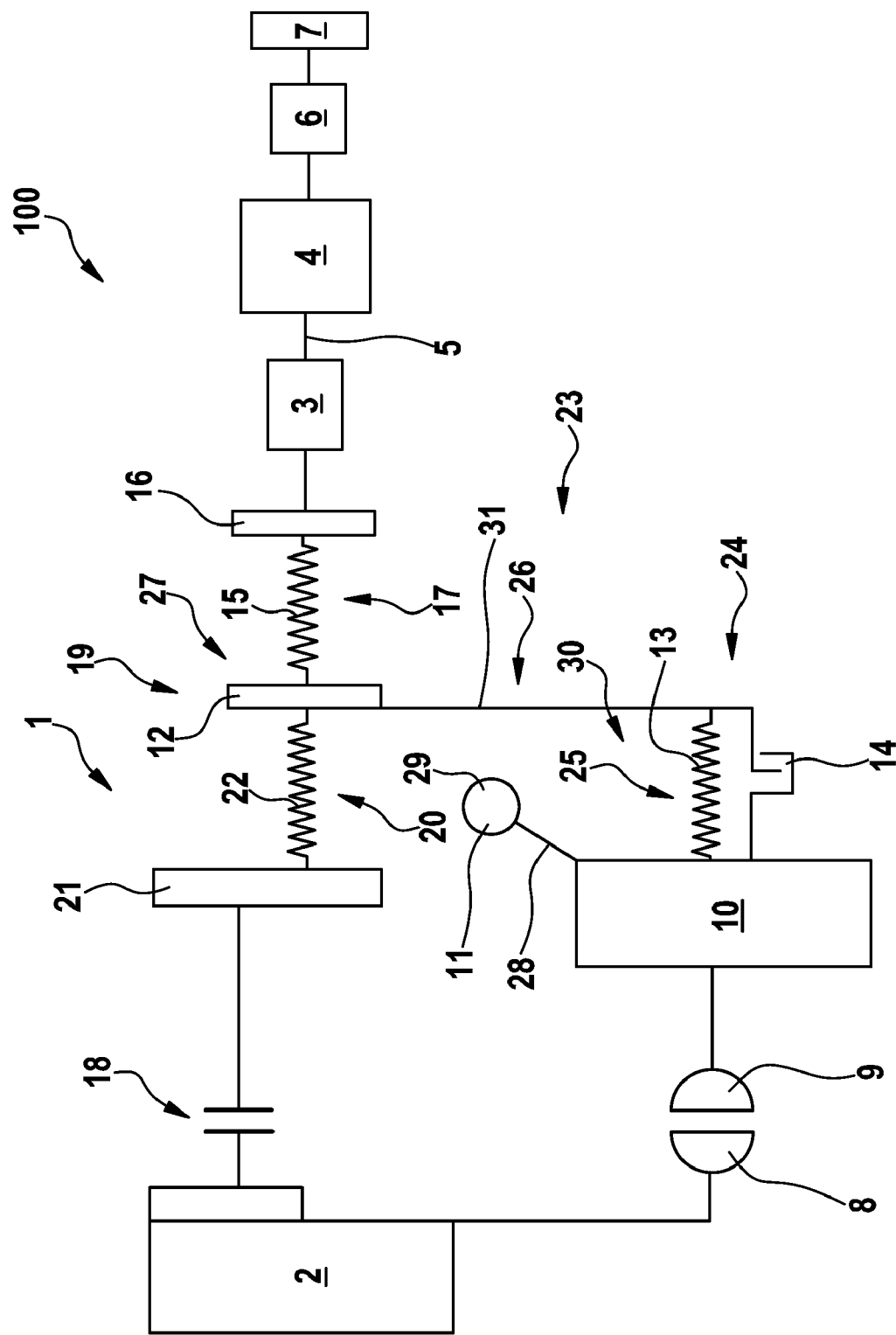
FIG. 1 a schematic depiction of a prototype in a motor vehicle.

FIG. 1 shows a schematically depicted prototype of a drive train 100 in a motor vehicle with a hydrodynamic torque converter 1, which is driven by an internal combustion engine 2, for instance, a 4-cylinder diesel engine. Torque is transmitted by the engine and possibly converted via an output part 3 to a transmission input shaft 5 belonging to the transmission 4. In the transmission 4, which can be an automated manual transmission, an automated gearshift stages or a continuously variable transmission, like toroidal or chain CVT, the transmission ratios are set corresponding to the driving states of the vehicle and the driving torque transmitted via a differential unit 6 to at least a drive wheel 7.

The torque converter 1 serves as a starting- and torque transmission element and provides two torque paths for the transmission of torque loaded with torsional-vibration, provided by the internal combustion engine 2. The one torque path is established through the hydrodynamic transmission via the impeller 8 and the turbine 9 coupled to it by means of a working fluid, whereby the turbine 9 is assigned symbolically to the turbine mass 10 on which the centrifugal force pendulum 11 is disposed. Energy accumulators 13 and a friction device 14 are disposed between the turbine mass 10 or rather the turbine 9 and an intermediate part 12, which are active during rotation of the turbine 9 relative to the intermediate part 12. Via the intermediate part 12, the input part of the damper stage 17 with the energy accumulators 15 and the output part 16, the torque from the output part 16 is transmitted to the output part 3 of the torque converter 1.

The second torque path occurs via the lock-up clutch 18 that is connected directly to or via a housing—not depicted—of the torque converter 1 upstream of the torsional vibration damper 19 with the two damper stages 17, 20. In this case, torque flows from the input part 21 of the torsional vibration damper 19 via the energy accumulator 22 of the first damper stage, whose output part is formed by the intermediate part 12, via the second damper stage 17 and the output part 3 in the transmission input shaft 5.

The operation of the torsional vibration insulation unit 23, comprising the torsional vibration damper 19 and torsional vibration absorber 30, for damping the torsional vibrations introduced from the internal combustion engine 2, occurs in different ways depending upon the torque flow via both torque paths. For an open lock-up clutch 18, the turbine absorber 24 is effective as a turbine damper stage 25 as a result of torque flowing through it. The turbine 9, forms the input part and the intermediate part 12 forms the output part of this damper stage and the turbine damper stage 25 is connected upstream of the damper stage 17 by forming a two-stage turbine damper 26. The centrifugal force pendulum 11 with its disk part 28 and the pendulum masses 29 that is limitedly displaceable relative to the latter in rotation direction is thereby assigned to the turbine 9 and acts as a single component of the torsional vibration absorber 30. The damper stage 20 has no function in converter's operation. It is obvious that, in converter operation for torque increase, a stator—non-depicted—can be disposed between the impeller 8 and turbine 9.

For a closed lock-up clutch 18, the two damper stages 17, 20, disposed in series against one another, are effective as a clutch damper 31, thus, the effect of the turbine damper stage 25 is dispensed with, since the turbine 9 is freely rotatable apart from a moment of inertia set through the turbine mass 10 and viscosity torque relative to the working fluid. The cover plate 31 is rotationally coupled with the intermediate part 12 in connection with the energy accumulators 13 coupled to the turbine mass 10 and the friction device 14 in the turbine absorber 24, which forms a two-piece torsional vibration absorber 30 for a closed lock-up clutch 18 in connection with the centrifugal force pendulum 12 coupled to the turbine mass 10.

Figure 2:
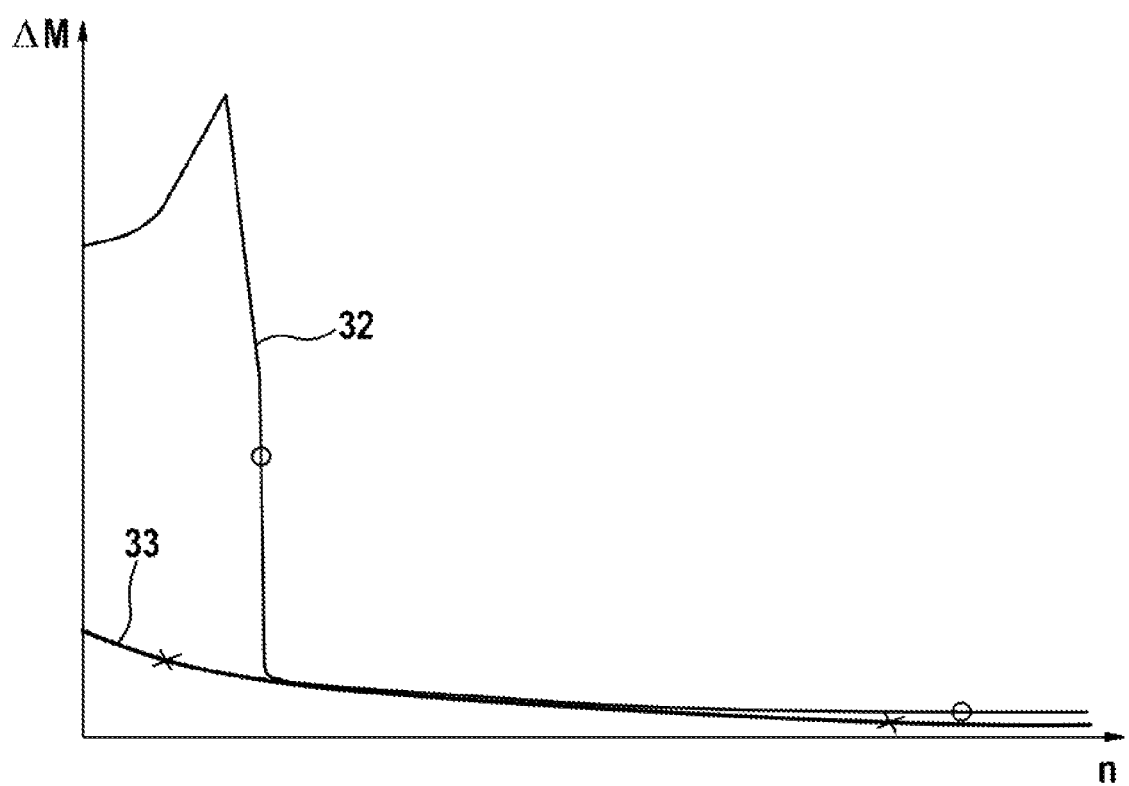
FIG. 2 a diagram depicting the vibration insulation of different torsional vibration insulation units.

FIG. 2 shows a diagram that shows the curves 32, 33 sampled on the differential 6, which respectively depict residual rotational irregularity $\Delta M$ plotted over the speed n of different torsional vibration insulation units disposed in a torque converter. The curve 32 with the symbols (o) shows the rotational irregularities of a drive train with a 4-cylinder diesel engine with a torque converter, in which a centrifugal force pendulum is effective without a switched-in turbine absorber. Through the wide vibration angles of this internal combustion engine in the speed range of approx. 1000/min, the pendulum masses of the centrifugal force pendulum knock on the disk part and cause noise on the differential, which is perceived as humming, and can be amplified by the body of the motor vehicle. Equipping the centrifugal force pendulum with vibration angles, which could prevent mutual knocking of the pendulum masses, does not meet the objective, for instance, due to reasons of tuning and manufacturing with correspondingly narrow tolerances, associated with a high technical scope.

The curve 33 with the symbols (x) shows the arrangement of FIG. 1. Regardless of a small vibration angle of pendulum masses in the range smaller than 40°, no significantly outstanding peaks occur over the uniform shape of the curve 33, which hint at a contact of the pendulum masses with the disk part. The turbine absorber 24 (FIG. 1) is therefore in a position to filter out vibration angles with large amplitudes so that the centrifugal force pendulum can be designed to absorb smaller vibration angles.

Figure 3:
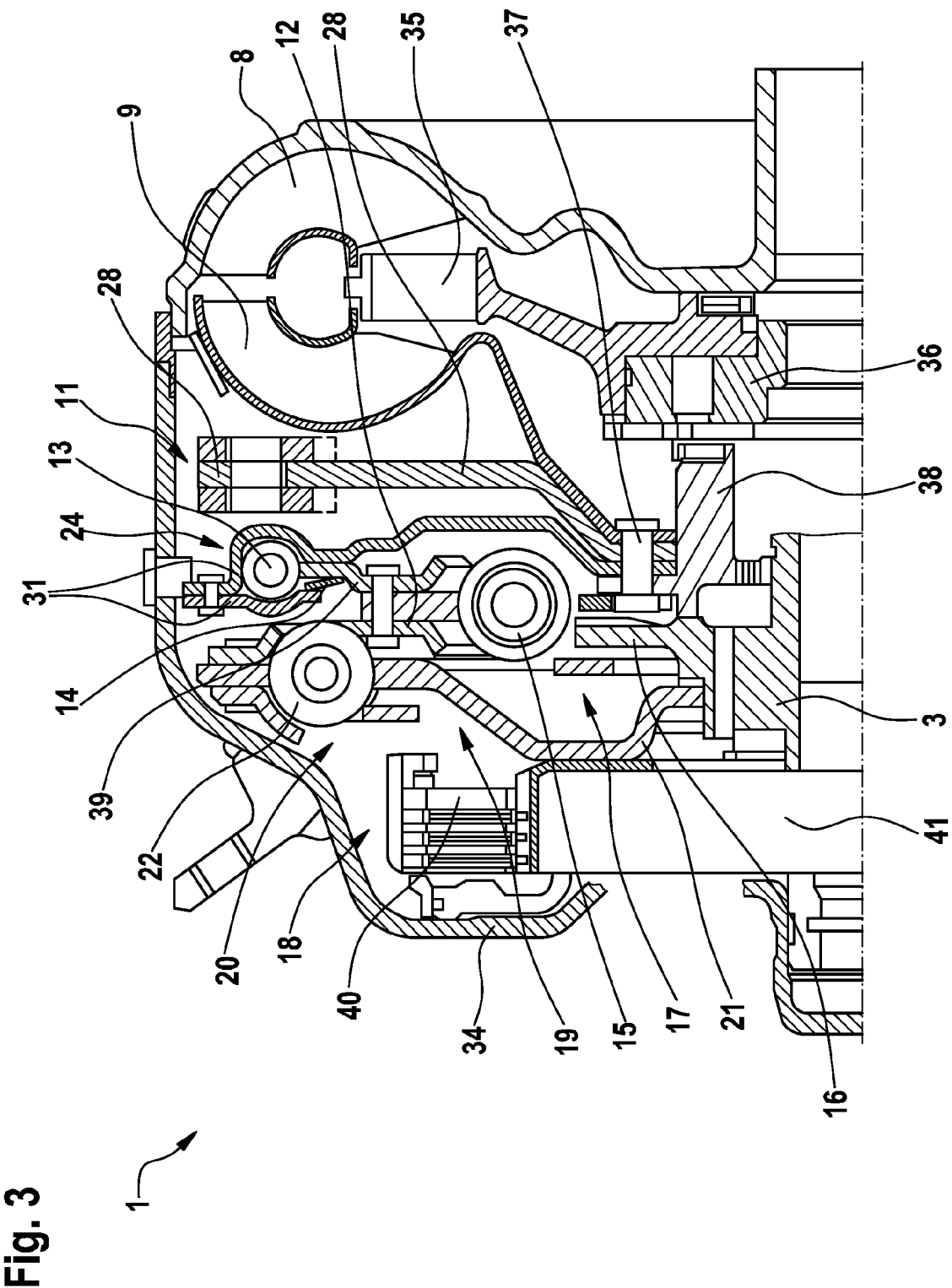
FIG. 3 a partial section through a hydrodynamic torque converter.

FIG. 3 shows an example embodiment of a torque converter 1 of FIG. 1. The torque converter 1 is mounted in the housing 34 driven by the internal combustion engine, to which the impeller 8—as shown—is directly coupled or to which it is connectable by means of a separating clutch in other exemplary embodiments. The impeller 8 drives the turbine 9; a stator 35 is disposed between the impeller 8 and the turbine 9 by means of a one-way clutch 36 attached to a fixed—non-depicted—transmission housing stator support.

The turbine 9 is fastened on the turbine hub 38, for example, by means of rivets 37. Also the disk part 28 of the centrifugal force pendulum 11 is fastened with the pendulum masses 29 by means of rivets 37. The cover plates 31, which are formed by the plates holding two of the energy accumulators 13, riveted together radially outside, are fastened non-rotatably on the turbine hub 38. The turbine absorber 24 is formed by the cover plates 31 connected with the turbine 9 and on the other hand pressurizing the energy accumulator 13 and the flange part 39 on the one hand pressurizing the energy accumulator 13 as well as the friction device 14 acting in between, through the diaphragm spring, formed between the cover plate 31 and the flange part 39.

The lock-up clutch 18 is formed in the depicted exemplary embodiment by a lamella package 40 that, for a closed lock-up clutch 18, transmits the torque present on the housing 34 to the lamella carrier 41, which is rigidly connected and riveted with the input part 21 of the torsional vibration damper 19. The torsional vibration damper 19 is formed as a two-stage unit with the damper stages 17, 20. The intermediate part 12 is disposed between the two damper stages 17, 20, which respectively pressurize the energy accumulators 15, 22 respectively on the input and/or output side. The energy accumulators 15 of the damper stage 17 are pressurized on the output side by the output part 16 of the torsional vibration damper 19, which is formed as a single piece with the output part 3. The output part 3 is splined with the transmission input shaft—not depicted in this exemplary embodiment—and limitedly receives the turbine hub 38 in a rotatable manner.

It is clear that, without change of the proposed concept, further advantageous space optimization measures on the torque converter 1 depicted in FIG. 3 are taken. For instance, the energy accumulators 13 use the space of the axial drawn-in torus-shaped ring room of the turbine 9, in the radial section above the riveting with the turbine hub 38. Thus, the disk part 28 and the constituent parts of the turbine absorber 24 can be matched accordingly.

The functional manner of the torque converter 1 of FIG. 1 was explained in detail based on the principle sketch of FIG. 1 and is at least essentially applicable to the torque converter 1 depicted in FIG. 3 that only deviates, as an exemplary embodiment, from the design of the torque converter 1 from FIG. 1.

REFERENCE SYMBOLS LIST 1 hydrodynamic torque converter
2 internal combustion engine
3 output part transmission
4 transmission
5 input shaft
6 differential unit
7 driving wheel
8 impeller
9 turbine
10 turbine mass
11 centrifugal force pendulum
12 intermediate part
13 energy accumulator
14 friction device
15 energy accumulator
16 output part
17 damper stage
18 lock-up clutch
19 torsional vibration damper
20 damper stage
21 input part
22 energy accumulator
23 torsional vibration insulation unit
24 turbine absorber
25 turbine damper stage
26 turbine damper
27 clutch damper
28 disk part
29 pendulum mass
30 torsional vibration absorber
31 cover plate
32 curve
33 curve
34 housing
35 stator
36 one-way clutch
37 rivet
38 turbine hub
39 flange part
40 lamella package
41 lamella carrier
100 drive train
AM non-uniformity of rotation
n speed

What we claim is:

1. A hydrodynamic torque converter (1), comprising:
    a turbine (9) driven by an impeller (8), connected with an output part (3);
    a housing (34);
    a torsional vibration damper (19) with first and second damper stages (17, 20);
    a turbine absorber (24) including:
        a torsional vibration absorber (30);
        an input component fixedly connected to the turbine; and,
        an output component fixedly connected to the torsional vibration damper; and,
    a lock-up clutch (18) connecting the housing (34) with the output part (3).

2. The hydrodynamic torque converter (1) according to claim 1, wherein for a closed lock-up clutch (18), the turbine (9) forms an absorber mass (10) of the turbine absorber (24).

3. The hydrodynamic torque converter (1) according to claim 1, wherein for an open lock-up clutch (18), the turbine absorber (24) forms a turbine damper stage (25) of a turbine damper (26).

4. The hydrodynamic torque converter (1) according to claim 1, wherein the damper stage (17) is jointly used by a clutch damper (27) and a turbine damper (26).

5. The hydrodynamic torque converter (1) according to claim 1, wherein a clutch damper (27) comprises an intermediate part (12) that is common to both damper stages (17, 20) with which a flange part (39) of the turbine absorber (24) is connected non-rotatably.

6. The hydrodynamic torque converter (1) according to claim 5, wherein a cover plate (31) that is limitedly rotatable relative to the flange part (39) against the effect of energy accumulators (13) is connected non-rotatably with the turbine (9).

7. The hydrodynamic torque converter (1) according to claim 5, wherein the output part (3) of the torque converter (1) is connected non-rotatably with a transmission input shaft (5) of a transmission (4), on which an input part (21) of the clutch damper (27) and of a turbine hub (38) is mounted rotatably and an output part (16) of the torsional vibration damper (19) is mounted non-rotatably.

8. The hydrodynamic torque converter (1) according to claim 7, wherein the output part (16) of the torsional vibration damper (19) and the output part (3) of the torque converter (1) are formed as a one-piece component.

9. The hydrodynamic torque converter (1) according to claim 6, wherein the cover plate (31), the turbine (9), and a disk part (28) of a centrifugal force pendulum (11) are disposed non-rotatably on a turbine hub (38).

10. The hydrodynamic torque converter (1) according to claim 9, wherein the cover plate (31), the turbine (9), and the disk part (28) are mounted by means of common rivets (37) on a flange on the turbine hub (38).

11. The hydrodynamic torque converter (1) according to claim 6, wherein a friction device (14) is provided between the flange part (39), and the cover plate (31).

12. The hydrodynamic torque converter (1) according to claim 11, wherein the friction device (14) is formed by a diaphragm spring braced between the flange part (39), and the cover plate (31).

13. A hydrodynamic torque converter, comprising:
a turbine with a turbine shell;
an impeller;
a multi-stage torsional vibration damper including:
    a first stage including a first input component and a first output component; and,
    a second stage including a second input component fixedly connected to the first output component and a second output component; and,
a torsional vibration absorber including:
    a centrifugal force pendulum fixedly connected to the turbine shell; and,
    a vibration damper including a third output component fixedly secured to the second input component.

14. A hydrodynamic torque converter, comprising:
a cover;
an impeller;
a turbine;
a torque converter clutch;
an output hub;
a multi-stage torsional vibration damper including:
    a first stage; and,
    a second stage disposed radially inward of the first stage; and,
a torsional vibration absorber including:
    a vibration damper; and,
    a centrifugal force pendulum fixedly connected to the turbine, wherein:
        when the torque converter clutch is open a first torque path is formed from the cover to the output hub through the impeller, the turbine, the vibration damper, and the second stage; and,
        when the torque converter clutch is closed a second torque path is formed from the cover to the output hub through the torque converter clutch and the first and second stages.

* * * * *